H. E. VAN NESS.
DRILL CHUCK.
APPLICATION FILED DEC. 15, 1910.

1,042,507.

Patented Oct. 29, 1912.

WITNESSES:
M. E. Verbeck.

INVENTOR
Henry E. Van Ness
BY
Eugene Owen
ATTORNEY

UNITED STATES PATENT OFFICE.

HENRY E. VAN NESS, OF ELMIRA, NEW YORK.

DRILL-CHUCK.

1,042,507.

Specification of Letters Patent.

Patented Oct. 29, 1912.

Application filed December 15, 1910. Serial No. 597,476.

*To all whom it may concern:*

Be it known that I, HENRY E. VAN NESS, a citizen of the United States, residing at Elmira, in the county of Chemung and State of New York, have invented certain new and useful Improvements in Drill-Chucks, of which the following is a specification.

This invention relates to improvements in chucks for drilling machines, and the like, and more particularly to improvements in the drill chuck described in Letters Patent #893,348, issued to Alexander P. Morrow under date of July 14, 1908; my object being to provide a construction of the chuck parts whereby the operation of the chuck to grip and release the drill shank may be easily accomplished by hand, regardless of the clamping pressure exerted through the jaws.

A further object is to simplify and cheapen the construction of the chuck.

I attain my object by constructing the drill chuck in the manner illustrated in the accompanying drawings, in which—

Figure 1:
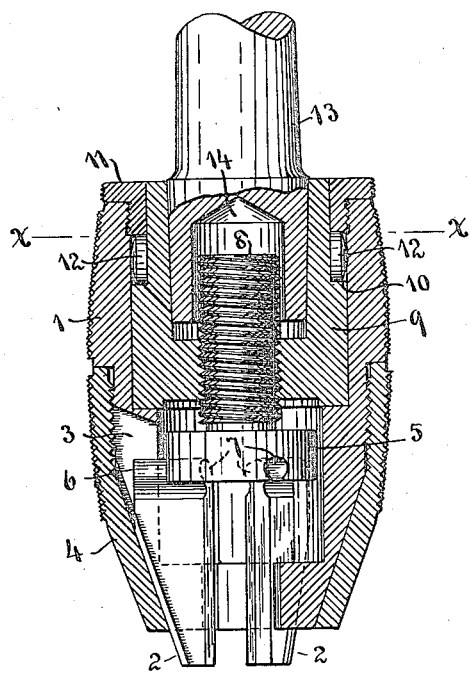
Figure 2:
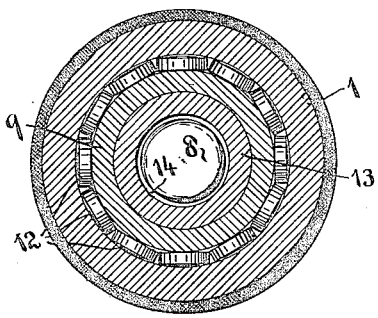

Figure 1 represents a longitudinal sectional elevation of the chuck; and Fig. 2, a transverse section on the line x—x in Fig. 1.

Like numerals designate like parts in the two views.

The chuck consists of a tubular shell 1, having a frusto-conical end portion provided with longitudinal slots to receive the jaws 2; which, in this type of chuck, are three in number, and set radially around the axis of the chuck, one of the longitudinal slots being shown at 3 in Fig. 1. The jaws are inclosed and limited in outward radial movement by the conical sleeve 4, screwed upon the shell 1. Within a chamber provided therefor in the outward end of the shell 1 is a disk 5, provided with radial grooves 7, to receive tenons formed on the inward ends of the jaws 2, these tenons and grooves, in the illustration, being shown as cylindrical in form, whereby the disk and jaws will be interlocked so that longitudinal movement of the disk in either direction will be imparted to the jaws.

The disk 7 is provided with a left-hand screw threaded stem 8, of smaller diameter, which is screwed into the end of the cylindrical block 9, revolubly fitted into the shell 1. To hold the shell upon the block 9, said block is provided with a shoulder at 10, whereby an annular channel or raceway is formed around the upper part of the block inside of the shell. The upper end of this raceway is closed by a cap 11, screwed into the end of the shell, the space between the cap and the shoulder 10 being filled by anti-friction rollers 12. The shell and the block are thus held, the one upon the other, with freedom to rotate with respect to one another without friction, when setting up or releasing the jaws.

Into a bore in the upper end of the block 9, which is slightly tapered, is fitted the shank 13, by which the chuck is fastened in the drill spindle in the usual manner. This shank is bored out at 14 to receive the end of the stem 8, which rises into said bore when the chuck jaws recede into their full open position. The chuck parts are thus condensed in length, without limiting the travel of the jaws.

To operate the chuck, when in place on the drill spindle, the drill shank will be inserted between the jaws and the shell 1 rotated to the left by hand. This rotation of the shell causes the jaws to rotate, carrying around with them the disk 5, and causing the stem 8 to be screwed outwardly in the block 9, thereby setting the jaws up toward one another radially to grip the drill shank. When the chuck is set up tightly by hand the drill spindle will be set in motion, and, as the drill is fed to the work, the resistance to rotation offered by the work causes the motion imparted by the block 9 to act upon the screw stem 8 to still further tighten the grip of the jaws upon the drill shank. Or, the drill spindle may be set in motion, the drill shank inserted between the jaws and the shell 1 held stationary until the jaws have been set up by reason of the screw 8, which is then held stationary, being moved outwardly by the turning of the block 9.

When the drill is to be removed, a simple and easy backward rotation of the shell 1 by hand will accomplish the release of the jaws without the aid of any tool; this easy release being attained by reason of the steep pitch of the threads on the comparatively small screw stem 8, the threads being double to attain the desired pitch, and the antifriction roller bearing between the block 9 and the shell 1; there being only a direct longitudinal thrust between the shoulder 10 and the cap 11 through the rollers, which can act in no way to cramp or bind the parts together. By reason of the construction, therefore, which I have adopted for the screw connection between the block 9 and the disk 5, and the roller bearing between the block 9 and the shell 1, I attain a quick and easy action whereby the release of the jaws will be effected by hand regardless of the force which has been exerted upon said jaws, in gripping them against the drill shank.

What I claim as my invention and desire to secure by Letters Patent is—

1. A chuck comprising a shell, a cylindrical block upon which the shell is revolubly mounted with an anti-friction end thrust bearing between the shell and block at their outward ends, jaws slidably mounted in longitudinal slots provided therefor in the walls of a hollow frusto-conical end portion of the shell which projects beyond said block, a disk having a radial interlocking and sliding engagement with the inward ends of the jaws, a screw-threaded stem of smaller diameter on the disk which screws into the inward end of the block and enters a bore of larger diameter therein, and a shank fitted into said bore with due allowance for the travel of the stem within the bore.

2. A chuck comprising a shell, a cylindrical block inserted therein and engaging a shoulder on the shell at its inward end, the outward end of the block being reduced in diameter to form an annular raceway between the block and shell, a plurality of rollers in said raceway, a cap piece secured to the shell to close said raceway, jaws slidably mounted in longitudinal slots provided therefor in the walls of a hollow frusto-conical end portion of the shell which projects beyond the block, a disk having radial interlocking and sliding engagement with the inward ends of the jaws at right angles to its axis, a screw-threaded stem of smaller diameter on the disk which screws into the inward end of the block and enters a bore of larger diameter therein, said bore extending to the outward end of the block and being tapered outwardly, and a shank fitted to said tapered bore and having a bore in its inward end to receive the stem.

In testimony whereof I have affixed my signature, in presence of two witnesses.

HENRY E. VAN NESS.

Witnesses:
  EUGENE DIVEN,
  M. E. VERBECK.